(12) United States Patent
Hirata et al.

(10) Patent No.: US 11,584,428 B2
(45) Date of Patent: Feb. 21, 2023

(54) STEERING DEVICE

(71) Applicant: HITACHI AUTOMOTIVE SYSTEMS, LTD., Hitachinaka (JP)

(72) Inventors: Atsushi Hirata, Atsugi (JP); Kazuya Yamano, Yamato (JP); Tatsuro Suzuki, Atsugi (JP); Masaki Kashima, Novi, MI (US)

(73) Assignee: HITACHI ASTEMO, LTD., Hitachinaka (JP)

( * ) Notice: Subject to any disclaimer, the term of this patent is extended or adjusted under 35 U.S.C. 154(b) by 694 days.

(21) Appl. No.: 16/554,447

(22) Filed: Aug. 28, 2019

(65) Prior Publication Data

US 2020/0086910 A1 Mar. 19, 2020

(30) Foreign Application Priority Data

Sep. 14, 2018 (JP) .............................. JP2018-172351

(51) Int. Cl.
*H02P 9/10* (2006.01)
*H02P 9/06* (2006.01)
*B62D 5/04* (2006.01)
*B62D 5/00* (2006.01)

(52) U.S. Cl.
CPC ........... *B62D 5/0487* (2013.01); *B62D 5/005* (2013.01); *H02P 9/06* (2013.01); *H02P 9/10* (2013.01)

(58) Field of Classification Search
CPC ......... B62D 5/0487; B62D 5/005; H02P 9/06; H02P 9/10
See application file for complete search history.

(56) References Cited

U.S. PATENT DOCUMENTS

| 2003/0048708 A1* | 3/2003 | Mashimo | G11B 7/094 369/53.26 |
| 2006/0097676 A1* | 5/2006 | Katahira | B62D 5/0463 318/432 |
| 2006/0176059 A1* | 8/2006 | Mir | G01R 31/343 324/503 |

(Continued)

FOREIGN PATENT DOCUMENTS

| JP | 2011-061910 A | 3/2011 |
| JP | 2011-072151 A | 4/2011 |

(Continued)

OTHER PUBLICATIONS

Notice of Reasons for Refusal dated Jan. 11, 2022 issued in JP Application No. 2018-172351, with English translation, 14 pages.

*Primary Examiner* — Kawing Chan
(74) *Attorney, Agent, or Firm* — Foley & Lardner LLP

(57) ABSTRACT

A steering device includes: an offset correction value storing section to store an offset correction value including a first offset correction value and a second offset correction value, the first offset value being a current value for correcting the first sensed current signal so that a value of a vibration of the electric motor is equal to or smaller than a first predetermined value when the motor rotation speed signal is a first rotation speed, and the second offset value being a current value for correcting the first sensed current signal so that the value of the vibration of the electric motor is equal to or smaller than a second predetermined value when the motor rotation speed signal is a second rotation speed.

11 Claims, 4 Drawing Sheets

(56) References Cited

U.S. PATENT DOCUMENTS

| | | | |
|---|---|---|---|
| 2010/0286870 A1* | 11/2010 | Endo | B62D 5/046 |
| | | | 701/41 |
| 2011/0074329 A1 | 3/2011 | Matsushita et al. | |
| 2013/0063061 A1* | 3/2013 | Hanada | H02P 27/08 |
| | | | 318/400.14 |
| 2014/0239861 A1 | 8/2014 | Ajima et al. | |
| 2015/0155805 A1 | 6/2015 | Iwaji et al. | |
| 2019/0013761 A1 | 1/2019 | Seo et al. | |

FOREIGN PATENT DOCUMENTS

| | | |
|---|---|---|
| JP | 2011-218927 A | 11/2011 |
| JP | 2014-168332 A | 9/2014 |
| JP | 5853096 B2 | 2/2016 |
| JP | 2017-055608 A | 3/2017 |

* cited by examiner

STEERING DEVICE

BACKGROUND

The present invention relates to a steering device arranged to provide a steering force to a turning mechanism.

A Japanese Patent No. 5853096 (corresponding to U.S. Patent Application Publication No. 2015/155805) discloses a motor drive device including an inverter arranged to drive a motor; a voltage division circuit which is a neutral point potential sensing section arranged to sense a neutral point potential of a stator winding of the motor; and a controller configured to presume a rotor position of the motor based on the sensed neutral point potential, and to control the inverter based on the presumed result.

In this case, a ground potential of the controller is set to a potential on a negative side or a positive side of a direct current voltage applied to the inverter. The voltage division circuit is configured to sense the neutral point potential with reference to the potential on the negative side or the positive side of the direct current voltage.

The controller is configured to presume the rotor position based on a difference between a constant first reference potential and a first neutral point potential sensed at ON/OFF operation of the inverter, and a difference between a constant second reference potential and a second neutral point potential sensed at the ON/OFF operation.

SUMMARY

In the steering device including the electric motor arranged to provide the steering force to the turning mechanism, it is possible to averagely suppress the torque vibration of the electric motor by calibrating the current sensor arranged to sense the current flowing in the stator coil of the electric motor.

However, the torque vibration is varied and deteriorated in accordance with the variation of the motor rotation speed since an appropriate value of the offset correction value is varied in accordance with the motor rotation speed.

It is, therefore, an object of the present invention to provide a steering device devised to solve the above-mentioned problems, and to suppress a variation and a deterioration of a torque vibration according to a variation of a motor rotation speed.

According to one aspect of the present invention, a steering device comprises: a turning mechanism arranged to turn steered wheels; an electric motor which includes a motor rotor and a stator coil, and which is arranged to provide a steering force to the steered wheels; a command current signal producing section configured to produce a first command current signal to control and drive the electric motor; a feedback control section configured to produce a second command current signal based on the first command current signal and a second sensed current signal; a PWM duty ratio signal producing section configured to produce a duty ratio signal which is a signal of a duty ratio, based on the second command current signal; a drive circuit which includes an inverter, and which is configured to control and drive the inverter based on the duty ratio signal, and to control an electric power supplied to the stator coil; a current sensor configured to sense a current value of a current flowing in the stator coil, and to output the sensed current value as a first sensed current signal; a motor rotation speed signal receiving section configured to receive a motor rotation speed signal which is a signal of a rotation speed of the electric motor; a second sensed current signal producing section configured to produce the second sensed current signal based on the first sensed current signal and an offset correction value; and an offset correction value storing section configured to store the offset correction value including a first offset correction value and a second offset correction value, the first offset value being a current value for correcting the first sensed current signal so that a value of a vibration of the electric motor is equal to or smaller than a first predetermined value when the motor rotation speed signal is a first rotation speed, or when a modulation rate of the PWM duty ratio signal producing section is a first modulation rate, and the second offset value being a current value for correcting the first sensed current signal so that the value of the vibration of the electric motor is equal to or smaller than a second predetermined value when the motor rotation speed signal is a second rotation speed, or when the modulation rate of the PWM duty ratio signal producing section is a second modulation rate.

DETAILED DESCRIPTION

Figure 1:
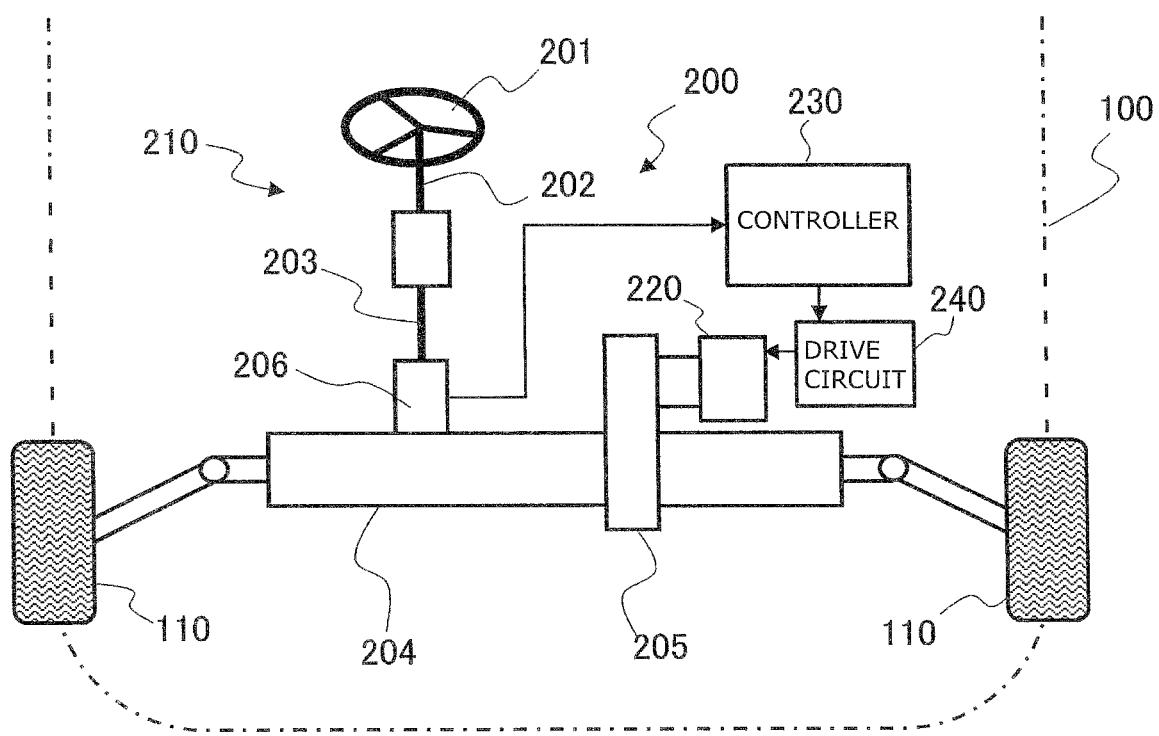
FIG. 1 is a configuration view showing a steering device according to a first embodiment of the present invention.

Hereinafter, a steering device according to one embodiment of the present invention is explained with reference to the drawings. FIG. 1 is a configuration view showing a steering device according to a first embodiment of the present invention.

A steering device 200 is an electric power steering device for a vehicle. The steering device 200 includes an electric motor 220 arranged to provide a steering force to a turning mechanism 210 arranged to turn (steer) steered wheels (front wheels) 110 and 110 of the vehicle 100.

The steering force by the electric motor 220 is provided for assisting the steering force of the driver, or for an autonomic steering.

The electric motor 220 is a three phase brushless motor including a motor rotor; and stator coils having u phase, v phase, and w phase.

The turning mechanism 210 includes a steering wheel 201; a steering shaft (turning shaft) 202; a pinion shaft 203; and a rack shaft 204.

In this turning mechanism 210, when a driver of the vehicle 100 rotates the steering wheel 201, the steering torque is transmitted through the steering shaft 202 to the pinion shaft 203.

Then, a rotation motion of the pinion shaft 203 is converted to a linear motion of the rack shaft 204 to turn the steered wheels 110 and 110 connected to both ends of the rack shaft 204.

A steering torque sensor 206 is mounted to the pinion shaft 203. The steering torque sensor 206 is arranged to sense the steering torque of the steering wheel 201.

For example, in a steering assist control, the controller 230 is configured to output a switch signal to a drive circuit 240 based on a torque command value according to a signal relating to a steering torque obtained from the steering torque sensor 206, and a signal relating to a vehicle speed, and thereby to perform a PWM control of a drive current of the electric motor 220.

A speed reduction mechanism 205 is arranged to transmit the torque produced by the electric motor 220, to the rack shaft 204.

Figure 2:
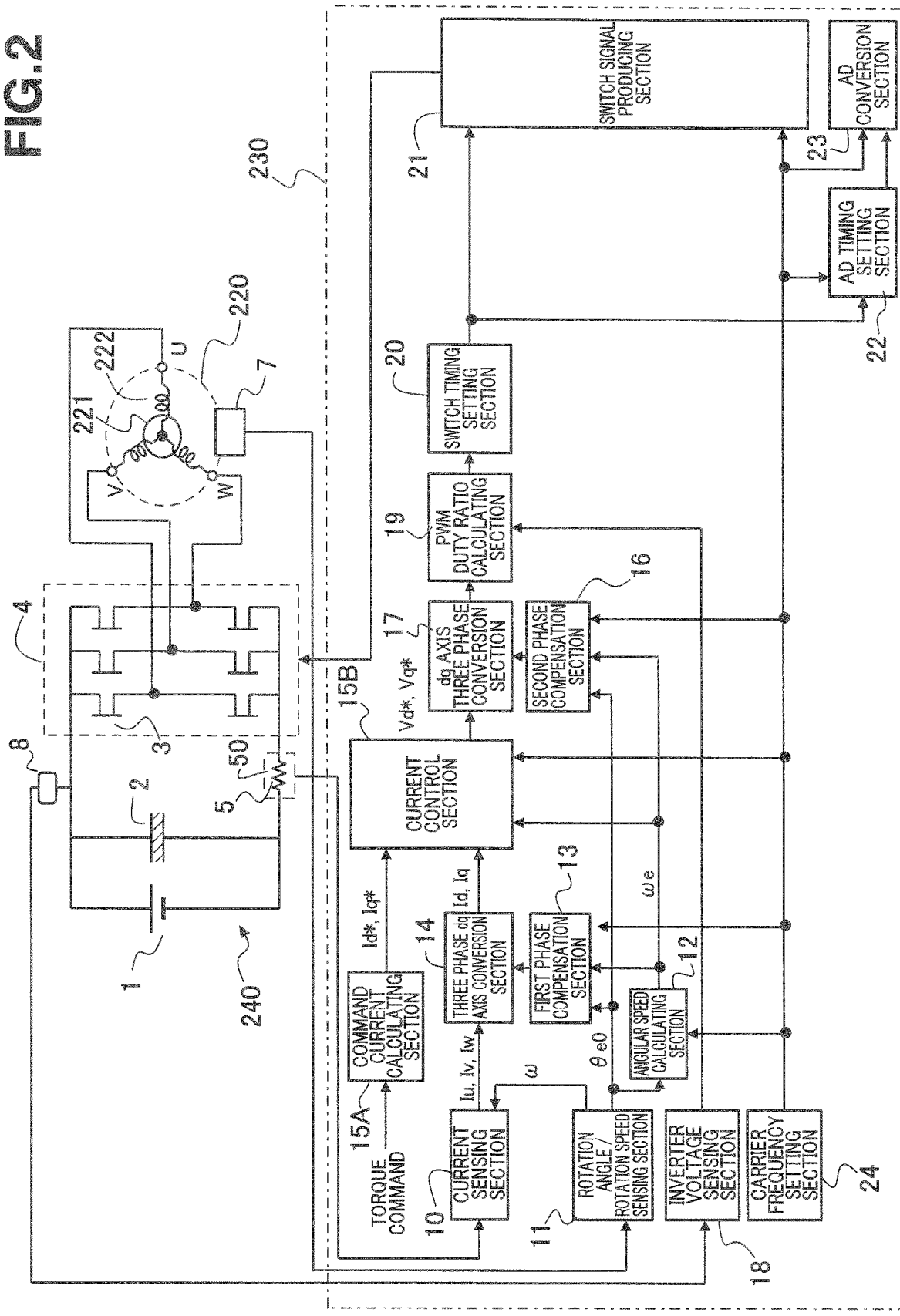
FIG. 2 is a view showing a controller and a drive circuit which are configured to control and drive an electric motor in the first embodiment of the present invention.

FIG. 2 is a diagram showing a functional block of the controller 203, and a circuit configuration of the drive circuit 240.

The drive circuit 240 includes a direct current power source 1; a smoothing capacitor 2; and a three phase bridge circuit 4 (three phase bridge inverter, three phase output inverter) including six switching elements 3.

Each of the switching elements 3 is, for example, a field effect transistor such as MOSFET.

The drive circuit 240 is configured to produce three phase alternating current by controlling the switching elements 3 by duty ratio signal, and to control the electric power supplied to the stator coils of the electric motor 220.

The drive circuit 240 includes a shunt resistor 5 directly connected between the three phase bridge circuit 4 and a ground.

The shunt resistor 5 is a resistor for sensing a direct current bus bar current (DC bus current) flowing in a direct current bus bar (DC bus, wire) between the three phase bridge circuit 4 and the ground, that is, the current flowing in the stator coils of the electric motor 220.

A current sensor 50 including the shut resistor 5 is configured to sense the direct current bus bar current flowing in the direct current bus bar between the three phase bridge circuit 4 and the ground, based on a potential difference between both ends of the shunt resistor 5, and to output the sensed value as a direct current bus bar current signal IDC (first detection current signal).

Besides, the direct current bus bar current flowing in the direct current bus bar (the wire) between the three phase bridge circuit and the direct current power source 1 can be sensed by the current sensor including the shunt resistor connected in serial with the direct current bus bar (the wire) between the three phase bridge circuit 4 and the direct current power source 1, and outputted as the direct current bus bar current signal IDC (the first sensed current signal).

Moreover, the drive circuit 240 includes an inverter voltage sensor 8 arranged to sense a voltage (inverter voltage) of the direct current power source 1.

Furthermore, the electric motor 220 includes a motor rotor (rotor) 221; a stator coil 222 including the u phase, the v phase, and the w phase; and a rotation angle sensor 7 arranged to sense an angle of the motor rotor 221.

Hereinafter, function of the controller 230 is explained with reference to FIG. 2.

A current sensing section 10 is configured to reproduce (presume) currents Iu, Iv, and Iw flowing in the u phase, the v phase, and the w phase, based on the direct current bus bar current signal IDC from the current sensor 50.

A rotation angle/rotation speed sensing section 11 is configured to sense a motor electrical angle (electrical degree) θe0 based on a rotation angle detection signal outputted from the rotation angle sensor 7, and to calculate a motor rotation speed ω (rpm) from a difference between a previous value and a present value of the motor electrical angle θe0.

An angular speed calculating section 12 is configured to calculate an electrical angular speed ωe from the difference between the previous value and the present value of the motor electrical angle θe0.

Besides, when the motor electrical angle θe0 has an error component, the electrical angular speed ωe may be vibrated. Accordingly, the angular speed calculating section 12 includes a digital filter (low pass filter) so as to perform a process to remove the vibration component of the electrical angular speed ωe.

A first phase compensation section 13 is configured to correct the motor electrical angle θe0 based on a time deviation (time lag) between the current sensing timing and the rotation angle sensing timing, and to output this corrected angle as an electrical angle θe1 at the current sensing timing.

A three phase dq axis conversion section 14 is configured to receive signals relating to the currents Iu, Iv, and Iw, and the electrical angle θe1. The three phase dq axis is configured to perform a coordinate transformation to replace the three phase alternating current to a two axis direct current, and to output a d axis current ID (magnetic flux current) and a q axis current Iq (torque current) for the vector control.

The command current calculating section 15A (the command current signal producing section) is configured to receive the signals relating to the torque command value of the electric motor 220 from the outside. The command current calculating section 15A is configured to produce a d axis command current Id* and a q axis command current Iq* based on the torque command value, and to output the d axis command current Id* and the q axis command current Iq* to the current control section 15B, as the first command current signal for controlling and driving the electric motor 220.

The current control section 15B is configured to receive the d axis current Id, the q axis current Iq, the d axis command current Id*, the q axis command current Iq*, and the electrical angular speed ωe, and to output a d axis command voltage Vd* and a q axis command voltage Vq* so that the d axis current Id and the q axis current Iq follow the d axis command current Id* and the q axis command current Iq*.

That is, the current control section 15B is a feedback control section configured to produce a second command current signal based on the d axis command current Id* and the q axis command current Iq* which are the first command current signals outputted from the command current calculating section 15A, and the d axis current Id and the q axis current Id which are the second sensed current signals obtained in the current sensing section 10 and the three phase dq axis conversion section 14.

The second phase compensation section 16 is configured to correct the electrical angle θe0 based on the time deviation (lag) between the output timing of the command voltage, and the rotation angle sensing timing, and to output the corrected angle as the electrical angle θe2 at the output timing of the command voltage.

The dq axis three phase conversion section 17 is configured to receive the d axis command voltage Vd*, the q axis command voltage Vq*, and the electrical angle θe2, to perform the coordinate transform to return the two axis command voltage for the vector control, to the actual three phase command voltage, and to output the three phase voltage commands Vu*, Vv*, and Vw* in the PWM control.

An inverter voltage sensing section 18 is configured to sense an inverter voltage Vinv based on the signal outputted from the inverter voltage sensor 8.

The PWM duty ratio calculating section 19 (the PWM duty ratio signal producing section) is configured to produce and output the three phase duty ratios Dutyu*, Dutyv*, and Dutyw* (the duty ratio signals), based on the ratio between the three phase voltage commands Vu*, Vv*, and Vw* (the second command current signals), and the inverter voltage Vinv.

A switching timing setting section 20 is configured to compare the three phase command duty ratios Dutyu*, Dutyv*, and Dutyw* and the PWM carrier signals, and to output switching timings THiu*, TLou*, THiv*, TLov*, THiw*, and TLow* of upstream side switching elements 3 (upper arms) and downstream side switching elements 3 (lower arms) of the respective three phases.

A switching signal producing section 21 (PWM duty ratio signal producing section) is configured to provide the switching signals (the ON/OFF control pulse signal, the PWM pulse signal) to six switching elements 3 of the three phase bridge circuit 4, based on the switching timings THiu*, TLou*, THiv*, TLov*, THiw*, and TLow*, and the PWM carrier cycle Tc.

That is, the electric power supplied to the stator coils (the u phase, the v phase, and the w phase) of the electric motor 20 is controlled by the PWM control of the inverter motor based on the duty ratio signals by the switching signal producing section 21.

An AD timing setting section 22 is configured to set and output AD timings TadI, Tadθ, and TadV at which the direct current bus bar current signal IDC, the motor electrical angle θe0, and the inverter voltage Vinv are set, by performing the AD conversion to the sensing signals of the sensors, based on the switching timings THiu*, TLou*, THiv*, TLov*, THiw*, and TLow*.

The AD conversion section 23 is configured to perform the AD conversion to the outputs (the current, the rotation angle, and the voltage) of the sensors at the AD timings TadI, TAdθ, and TadV, with reference to the signals synchronous to the control cycle produced from the PWM carrier cycle Tc.

The carrier frequency setting section 24 is configured to select one of a plurality of the carrier cycle Tc which are previously prepared, to produce a control cycle Tcc which is integer multiple of the selected PWM carrier cycle Tc, and to output the PWM carrier cycle Tc to the angular speed calculating section 12, the first phase compensation section 13, the current control section 15B, the second phase compensation section 16, the switching timing setting section 20, the switching signal producing section 21, the AD timing setting section 22, and the AD conversion section 23 which are dependent on the control cycle Tcc.

Figure 3:
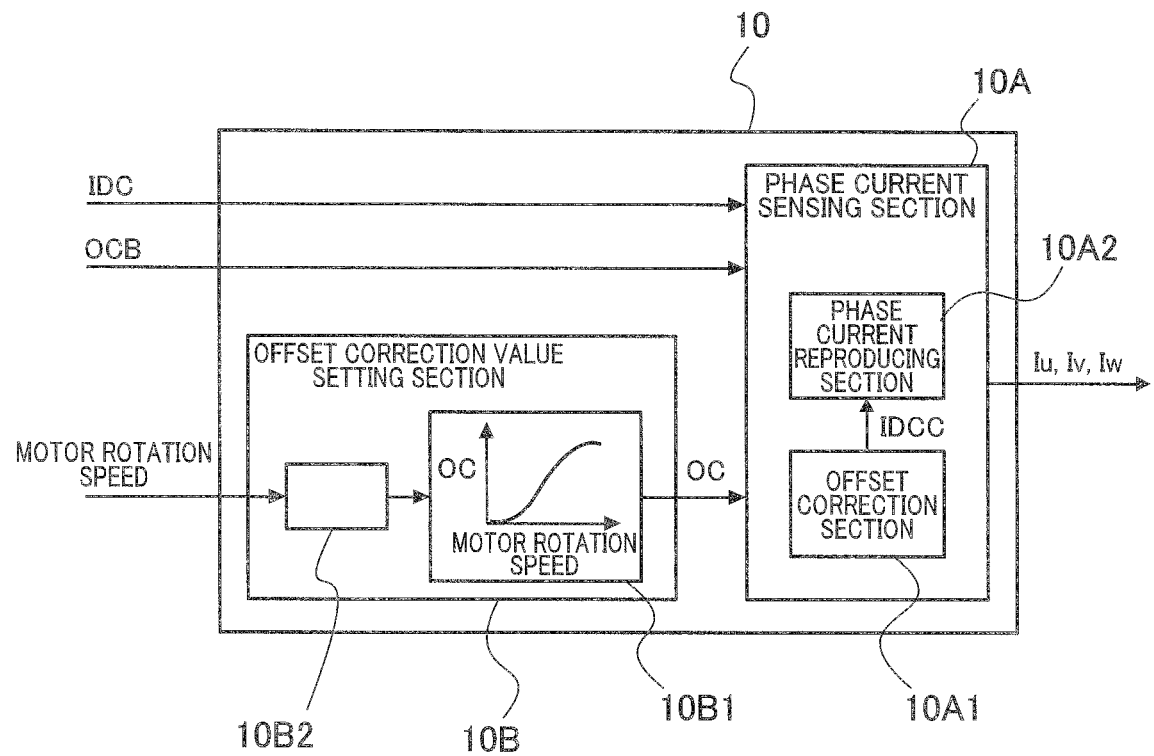
FIG. 3 is a block diagram showing a current sensing section of the controller.

FIG. 3 is a block diagram showing an offset correction function of the direct current bus bar current signal IDC in the current sensing section 10 shown in FIG. 2.

The current sensing section 10 includes a phase current sensing section 10A and an offset correction value setting section 10B.

The offset correction value setting section 10B includes a map section (offset correction value storing section) 10B1 configured to store an offset correction value at each motor rotation speed (rpm); and a motor rotation speed signal receiving section 10B2 configured to receive the motor rotation speed signal which is a signal of the rotation speed of the electric motor 220. The offset correction value setting section 10B is configured to search and output the offset correction value OC corresponding to the motor rotation speed signal.

The phase current sensing section 10A (the second sensing current signal producing section) is configured to receive the signals relating to the direct current bus bar current signal IDC sensed by the current sensor 50, the reference offset correction value OCB, and the offset correction value OC from the offset correction value setting section 10B.

Moreover, the phase current sensing section 10A includes an offset correction section 10A1 configured to produce a result obtained by adding the reference offset correction value OCB and the offset correction value OC to the inputted direct current bus bar current signal IDC (the first sensed current signal) as the direct current bus bar current signal IDCC (the second sensed current signal: IDCC=IDC+OCB+OC) after the offset correction; and a phase current reproducing section 10A2 configured to reproduce the currents Iu, IV, and Iw flowing in the u phase, the v phase, and the w phase, based on the direct current bus bar current signal IDCC after the offset correction, and to output signals relating to the reproduced currents Iu, Iv, and Iw.

The reference offset correction value OCB is an offset value (correction current value) set to calibrate the direct current bus bar current signal IDC outputted by the current sensor 50 when the electric motor 220 is in the rotation stop state (a predetermined rotation speed). The reference offset correction value OCB is a constant value which does not relate to the motor rotation speed.

On the other hand, the offset correction value OC is a correction current value set to be varied in accordance with the motor rotation speed. The offset correction value OC is a value previously set based on experiment and simulation so that the torque vibration (dB) of the electric motor 220 becomes a set value (for example, a minimum value) at each motor rotation speed.

Besides, the offset correction value OC is set at each condition of the motor rotation speed including the modulation rate in the PWM control, and the variation of the PWW carrier frequency.

Figure 4:
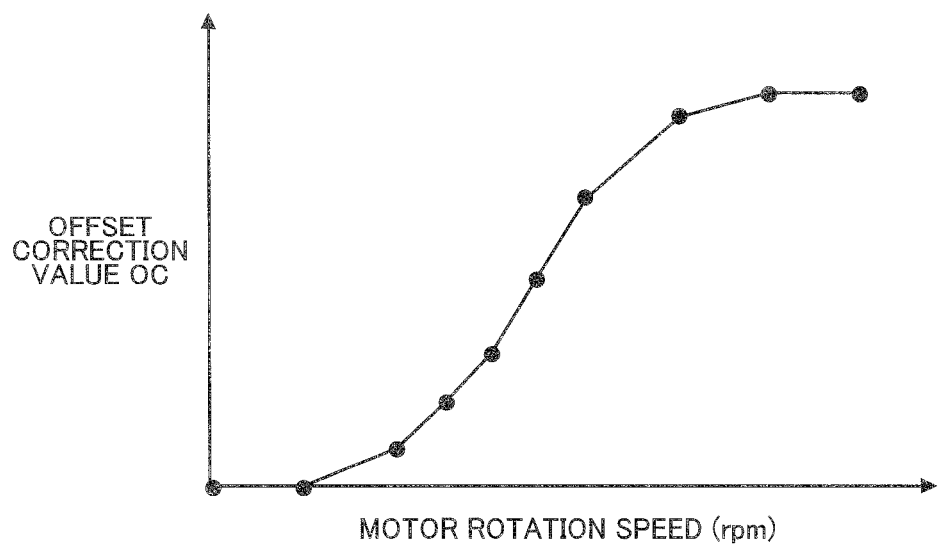
FIG. 4 is a diagram showing a relationship between a motor rotation speed and an offset correction value.

FIG. 4 is a graph showing a relationship between the motor rotation speed and the offset correction value OC, that is, an offset correction value map stored in the map section 10B1.

In example shown in FIG. 4, the offset correction value OC (≥0) is set to be a greater value as the motor rotation speed becomes higher. This means that the correction request for bringing the torque vibration to the minimum value tends to be increased as the motor rotation speed becomes higher.

The offset correction value OC is a current value to correct the direct current bus bar current signal IDC used in the motor control, so as to bring the torque vibration to the minimum value at each motor rotation speed. The offset correction value OC includes a first offset correction value OC1 which is a current value to correct the direct current bus bar current signal IDC so that the torque vibration becomes equal to or smaller than a first predetermined value when the motor rotation speed is a first rotation speed; and a second offset correction value OC2 which is a current value to correct the direct current bus bar current signal IDC so that the torque vibration becomes equal to or smaller than a second predetermined value when the motor rotation speed is a second rotation speed different from the first rotation speed.

In this case, the first predetermined value and the second predetermined value of the torque vibration may be the same value or different values. Moreover, the first predetermined value and the second predetermined value of the torque vibration may be a minimum torque vibration attainable at each motor rotation speed, or a desired torque vibration (allowable maximum torque vibration) which is greater than the minimum torque vibration.

Moreover, the first rotation speed and the second rotation speed may be, respectively, predetermined rotation speed ranges including the predetermined rotation speed. That is, a constant offset correction value can be provided in a rotation speed range.

The map section 10B1 stores a relationship between the motor rotation speed and the offset correction value OC, as a map (conversion table to convert the data of the motor rotation speed to the offset correction value OC). Accordingly, it is possible to set the appropriate offset correction value OC at each motor rotation speed even when the variation tendency of the offset correction value OC with respect to the variation of the motor rotation speed is complicated.

In this case, the offset correction value setting section 10B may be configured to vary the offset correction value OC in accordance with the modulation rate in the PWM control, in place of the condition of the motor speed. In this configuration, it is possible to suppress the variation and the deterioration of the torque vibration due to the variation of the motor rotation speed.

In this case, the offset correction value OC includes a first offset correction value OC1 to correct the direct current bus bar current signal IDC so that the value of the torque vibration becomes equal to or smaller than a first predetermined value when the modulation rate is a first modulation rate; and a second offset correction value OC2 to correct the direct current bus bar current signal IDC so that the value of the torque vibration becomes equal to or smaller than a second predetermined value when the modulation rate is a second modulation rate which is different from the first modulation rate.

The modulation rate is a rate of a signal wave to a carrier wave. For example, when the modulation rate at the maximum voltage output of the triangular wave comparison PWM system is the modulation rate=1, the line voltage is 0.866 ($\sqrt{3}/2$) at the modulation rate=1.

In this case, the first predetermined value and the second predetermined value of the torque vibration can be the same value or different values. Moreover, the first predetermined value and the second predetermined value of the torque vibration can be a minimum torque vibration which is attainable at each motor rotation speed.

The phase current sensing section 10A is configured to set, to the direct current bus bar current signal IDCC after the offset correction, a result obtained by adding the reference offset value OCB and the offset correction value OC according to the modulation rate, to the direct current bus bar current signal IDC sensed by the current sensor 50, and to reproduce the current Iu, Iv, and Iw based on this direct current bus bar current signal IDCC after the offset correction.

Besides, the motor speed is easy to use as the control parameter relative to the modulation rate. Accordingly, when the offset correction value setting section 10B sets the offset correction value OC in accordance with the motor rotation speed, it is possible to readily obtain the offset correction value OC according to the variation of the driving condition of the electric motor 220.

Moreover, in a case where the offset correction value setting section 10B sets the offset correction value OC in accordance with the motor rotation speed, the offset correction value setting section 10B has an offset correction adjusting section configured to adjust and vary the offset correction value OC in accordance with the variation of the environment temperature of the electric motor 220.

The modulation rate is varied in accordance with the variation of the environment temperature of the electric motor 220. Accordingly, the offset correction value setting section 10B is configured to obtain the offset correction value OC according to the variation of the modulation rate by adjusting the offset correction value OC in accordance with the environment temperature.

Figure 5:
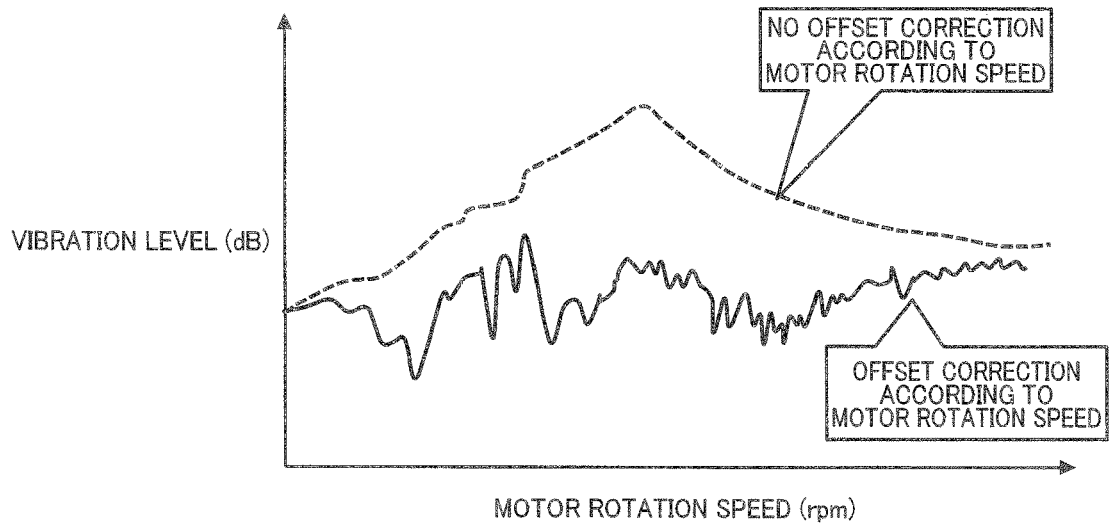
FIG. 5 is a diagram for explaining effects of the offset correction according to the motor rotation speed.

FIG. 5 shows a difference of the torque vibration of the electric motor 220 by whether or not the direct current bus bar current signal IDC is corrected based on the offset correction value OC, that is, shows effects of the correction of the direct current bus bar current signal IDC based on the offset correction value OC.

As shown in FIG. 5, in a case where the offset correction is not performed by the offset correction value OC, the torque vibration is generated to have a peak value at a predetermined motor rotation speed.

On the other hand, in a case where the offset correction is performed by the offset correction value OC, the torque vibration at each motor rotation speed becomes smaller than the torque vibration in the case where the offset correction is not performed by the offset correction value OC. Moreover, it is possible to suppress the large variation of the torque vibration even when the motor rotation speed is varied.

Accordingly, the controller 230 can smoothly drive the motor to suppress the torque vibration. Furthermore, it is possible to improve the steering feeling of the steering device 200.

When the map section (the offset correction value storing section) 10B1 determines the offset correction value OC corresponding to the motor rotation speed at that time with reference to the offset correction value map, the map section (the offset correction value storing section) 10B1 is configured to determine the offset correction value OC corresponding to the motor rotation speed at that time, by interpolation operation (calculation) using a plurality of the offset correction values OC which are stored in the map, and which correspond to the motor rotation speeds approximated to the actual motor rotation speeds.

That is, when the motor rotation speed signal is between the first rotation speed and the second rotation speed, the map section 10B1 is configured to determine a value between the first offset correction value OC1 at the first rotation speed, and the second offset correction value OC2 at the second rotation speed, by the interpolation operation, and to output the determined value as the interpolation value of the offset correction value OC. That is, the map section 10B1 has a function of a data interpolation section.

In this case, the phase current sensing section 10A is configured to correct the direct current bus bar current signal IDC (the first sensed current signal) based on the interpolation value of the offset correction value OC which is outputted by the map section 10B1, and the reference offset correction value OCB, and thereby to produce the direct current bus bar current signal IDCC (the second sensed current signal) after the correction. The phase current sensing section 10A is configured to reproduce the respective phase currents of the three phases based on the direct current bus bar current signal IDCC after the correction.

With this, the controller 230 can decrease the data numbers (amounts) of the offset correction value map (decrease the memory usage amounts by the map), and continuously vary the offset correction value OC in accordance with the variation of the motor rotation speed. Accordingly, it is possible to stably suppress the torque vibration of the electric motor 220.

Moreover, the map section 10B1 (data interpolation section) uses a linear interpolation (primary interpolation) as the interpolation operation. With this, it is possible to determine the interpolation value of the offset correction value OC by a simple operation.

Furthermore, the data of the offset correction value OC according to the motor rotation speed in the offset correction value map is data used for the offset correction of the direct current bus bar current signal IDC when the rotation direction of the electric motor 220 is both in the normal direction and in the reverse direction.

Accordingly, the offset correction value setting section 10B needs not to have the offset correction value maps for the respective rotation directions of the electric motor 220. Therefore, it is possible to suppress the increase of the data number of the offset correction value map.

Hereinafter, the calculation process of the currents Iu, Iv, and Iw by the phase current sensing section 10A (the phase current reproducing section 10A2), specifically, the method of reproducing the currents in the respective phases from the direct current bus bar current signal IDCC is explained.

Figure 6:
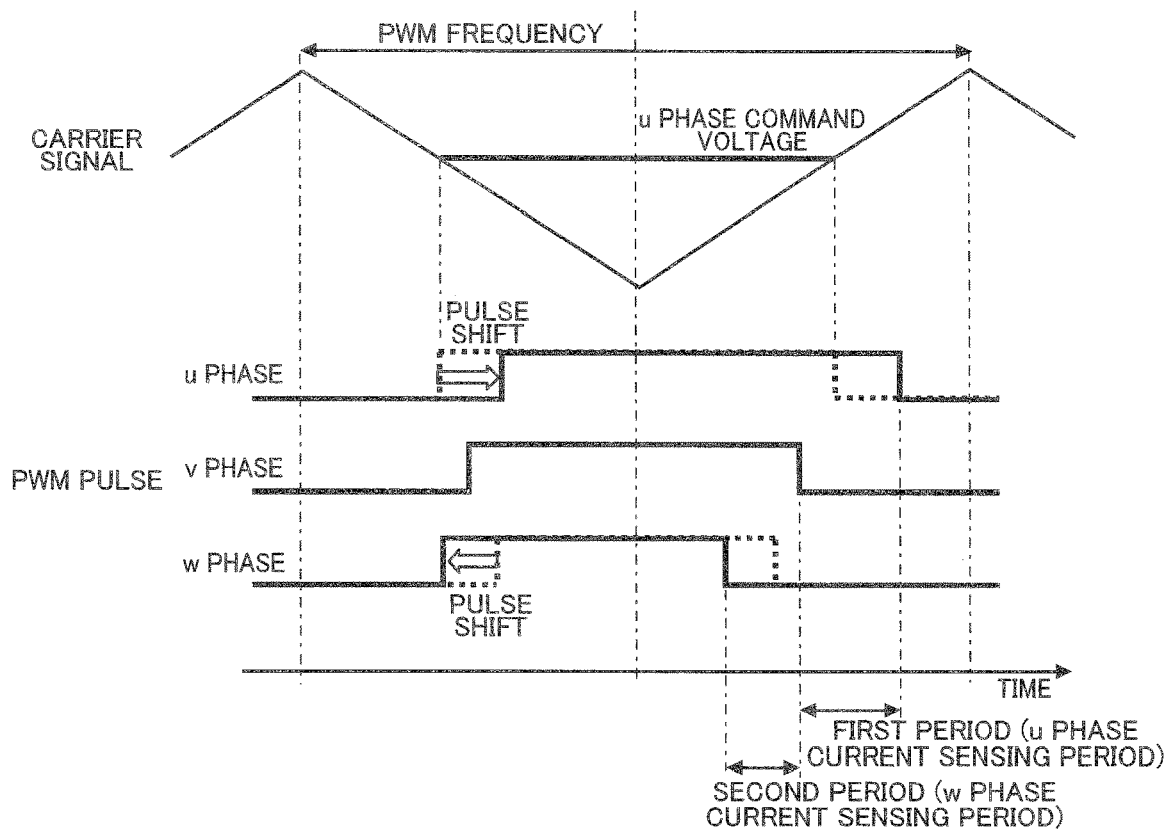
FIG. 6 is a time chart for explaining a relationship between PWM pulses and sampling timings of direct current bus current in respective phases.

FIG. 6 shows the u phase duty ratio signal, the v phase duty ratio signal, and the w phase duty signal which are the switching signals (the PWM pulse signals) of the upper arm in the interpolation type PWM control.

Moreover, the switching timing setting section 20 (the pulse shift control section) is configured to perform a pulse shift control to shift a pulse center of the switching signal from a valley of the triangular wave in the forward direction or in the rearward direction, for ensuring the current sampling section. FIG. 6 shows a state in which the pulse shift control is performed.

That is, the controller 230 is configured to perform the pulse shift control to reproduce the currents in the respective phases from the direct current bus bar current signal IDC. During the pulse shift control, the controller 230 is configured to perform the offset correction to the direct current bus bar current signal IDC by the offset correction value OC according to the motor rotation speed, and the reference offset correction value OCB, and to reproduce the currents in the respective phases based on the direct current bus bar current signal IDCC after the offset correction.

The offset correction value OC according to the motor rotation speed is set so that the torque vibration becomes a minimum value at each motor rotation speed under the condition in which the pulse shift control is performed. With this, the torque vibration of the electric motor 220 is suppressed at the actual motor control at which the pulse shift control is performed.

In the example of FIG. 6, an ON time period (energization time period, and pulse width) of the u phase duty ratio signal is longest. An ON time period of the w phase duty ratio signal is shortest. An ON time period of the v phase duty ratio signal is shorter than the ON time period of the u phase duty ratio signal, and longer than the ON time period of the w phase duty ratio signal.

That is, in a case where the lengths of the ON time periods of the duty ratio signals are compared among the three phases, the ON time period of the u phase is "maximum", the ON time period of the v phase is "intermediate", and the ON time period of the w phase is "minimum". In a case where the three phases are distinguished by the lengths of the ON time periods of the duty ratio time period, the u phase is a maximum phase, the v phase is an intermediate phase, and the w phase is a minimum phase.

In the example of FIG. 6, a first period in which the u phase duty ratio signal is the ON state, and the v phase duty ratio signal and the w phase duty ratio signal are the OFF state, and a second period in which the u phase duty ratio signal and the v phase duty ratio signal are the ON state, and the w phase duty ratio signal is the OFF state are generated.

In this case, in the first period, the current flows from the direct current power source 1 to the u phase. Then, the current is divided from u phase to flow in the v phase and the w phase. Moreover, the currents flowed in the v phase and the w phase are converged (joined) to flow in the shunt resistor 5.

Accordingly, the direct current bus bar current (the first direct current bus bar current) sensed by the current sensor 50 in the first period is the current Iu flowing in the u phase (the maximum phase).

On the other hand, in the second period, the current flows from the direct current power source 1 to the u phase and the w phase. Then, the currents are converged (joined) to flow in the w phase. The current flowed in the w phase flows in the shunt resistor 5.

Accordingly, the direct current bus bar current (the second direct current bus bar current) sensed by the current sensor 50 in the second period is the current Iw flowing in the w phase (the minimum phase).

The phase current reproducing section 10A2 is configured to sample the output of the current sensor 50 in the first period, and thereby to measure the current Iu flowing in the u phase (the maximum phase). Moreover, the phase current reproducing section 10A2 is configured to sample the output of the current sensor 50 in the second period, and thereby to measure the current Iw flowing in the w phase (the minimum phase).

Moreover, the three phase alternating currents become zero by instantaneously summarizing the three phase alternating currents. With this, the phase current reproducing section 10A2 is configured to calculate the current Iv flowing in the v phase (the intermediate phase) from the measurement value of the current Iu, and the measurement value of the current Iw. Finally, the phase current reproducing section 10A2 is configured to reproduce the currents Iu, Iv, and Iw flowing in the u phase, the v phase, and the w phase.

In this way, the phase current reproducing section 10A2 is configured to determine the sampling timing (measurement timing) of the direct current bus bar current sensed by the current sensor 50, based on the combination of the ON/OFF states of the duty ratio signals of the respective phases, and thereby to reproduce the currents of the respective phases from the direct current bus bar current.

Besides, in the example of FIG. 6, the ON time period of the u phase duty ratio signal is longest. The ON time period of the w phase duty ratio signal is shortest. However, in other energization patterns, the phase current reproducing section 10A2 (the phase current presuming section) is configured to directly measure the currents of the two phases (the maximum phase and the minimum phase) by the current sensor 50, and to presume the current of the residual one phase from the measurement results of the two phases. With this, the phase current reproducing section 10A2 is configured to reproduce the currents in the respective phases.

That is, in the first period in which the duty ratio signal of the phase (the maximum phase) where the ON time period is longest is the ON state, and in which the duty ratio signals of the other two phases are the OFF state, the phase current reproducing section 10A2 is configured to sample the output of the current sensor 50, and thereby to measure the current flowing in the phase (the maximum phase) in which the ON time period is longest.

Moreover, in the second period in which the duty ratio signals of the phase (the maximum phase) where the ON time period is longest, and the duty ratio signal of the phase (the intermediate phase) where the ON time period is the intermediate value are the ON state, and in which the duty ratio signal of the residual one phase, that is, the duty ratio signal of the phase (the minimum phase) where the ON time period is shortest is the OFF state, the phase current reproducing section 10A2 is configured to sample the output of the current sensor 50, and thereby to measure the current flowing in the phase (the minimum phase) in which the ON time period is shortest.

After the determinations of the current in the maximum phase and the current in the minimum phase, the phase current reproducing section 10A2 is configured to calculate the current in the intermediate phase by using the three phase alternating currents becoming 0 by instantaneously summarizing the three phase alternating currents.

The switching timing setting section 20 having the function of the pulse shift control section is configured to perform the pulse shift control so as to ensure the lengths of the first time period and the second time period shown in FIG. 6, and to reproduce the currents in the respective phases from the sensed value of the direct current bus bar currents.

That is, when a difference $\Delta TO1$ ($ms$) between the ON timing of the duty ratio signal of the maximum phase in which the ON time period of the duty ratio signal is longest, and the ON timing of the duty ratio signal of the intermediate phase in which the ON time period of the duty ratio signal is the intermediate value is smaller than a first predetermined time period T1, the switching timing setting section 20 is configured to correct and shift the phase of the ON timing of the duty ratio signal of the maximum phase in which the ON time period is longest, and/or the phase of the ON timing of the duty ratio signal of the intermediate phase in which the ON time period is the intermediate value, with respect to the triangular wave carrier so that the difference $\Delta TO1$ becomes equal to or greater than a second predetermined time period greater than the first predetermined value T1.

Besides, the difference $\Delta TO1$ relates to the length of the first time period. The pulse shift control to correct the phase of the ON timing so that the difference $\Delta TO1$ becomes equal to or greater than the second predetermined value T2 is a control for setting the length of the first time period to be equal to or greater than the predetermined time period.

Moreover, when a difference $\Delta TO2$ ($ms$) between the ON timing of the duty ratio signal of the intermediate phase, and the ON timing of the duty ratio signal of the minimum phase becomes smaller than the first predetermined value T1, the switching timing setting section 20 is configured to correct and shift the phase of the ON timing of the duty ratio signal of the intermediate phase and/or the minimum phase with respect to the triangular wave carrier so that the difference $\Delta TO2$ becomes equal to or greater than the second predetermined value T2 (T2>T1).

Besides, the difference $\Delta TO2$ relates to the length of the second time period. The pulse shift control to correct the phase of the ON timing so that the difference $\Delta TO2$ becomes equal to or greater than the second predetermined value T2 is a control for setting the length of the second time period to be equal to or greater than the predetermined time period.

As described above, the phase current reproducing section 10A2 is configured to determine the timing of the sampling of the output of the current sensor 50 based on the ON timings of the duty ratio signals of the respective phases, and thereby to presume the currents of the respective phases from the direct current bus bar current sensed by the current sensor 50.

Accordingly, the number of the current sensor is decreased relative to a case where the current sensors are provided to the sensor coils of the respective phases.

Besides, in the drive control of the electric motor 220 including the current sensors in the respective phases, the phase currents sensed by the respective current sensors can be corrected by the offset correction value OC according to the motor rotation speed.

Moreover, by performing the pulse shift control, the phase current reproducing section 10A2 is configured to sufficiently ensure the period for sampling the output of the current sensor 50, that is, the lengths of the first period and the second period which are the sensing period of the direct current bus bar current, and to stably sense the phase currents even when the ON timings of the duty ratio signals of the respective phases are varied.

Furthermore, the controller 230 is configured to correct the sensed value of the direct current bus bar current by the current sensor 50 by the reference offset value OCB, and the offset correction value OC according to the motor rotation speed. Accordingly, it is possible to effectively suppress the increase of the torque vibration at the pulse shift control.

The offset correction value OC is set so that the torque vibration of the electric motor 220 is equal to or smaller than the predetermined value at the pulse shift control. With this, it is possible to suppress the variation of the torque vibration by the pulse shift control.

The switching signal producing section 21 (the PWM duty ratio signal producing section) is configured to adjust the carrier frequency to decrease the loss due to the dead time when the motor rotation speed is equal to or greater than a predetermined rotation speed (third rotation speed). With this, it is possible to improve the driving efficiency of the electric motor 220.

Besides, the variation tendency of the offset correction value OC is complicated by adjusting the carrier frequency by the switching signal producing section 21. However, the current sensing section 10 is configured to store the offset correction value OC as the map data. With this, it is possible to readily obtain the offset correction value OC including the condition of the carrier frequency.

Moreover, when the motor rotation speed is equal to or greater than a predetermined rotation speed (a fourth rotation speed), the current sensing section 10 is configured to set the offset correction amount by the offset correction value OC to the value of the maximum rotation speed in the map, and thereby to produce the direct current bus bar current signal IDCC after the offset correction. With this, it is possible to omit the interpolation operation, the search of the offset correction value OC from the map, and to decrease the data amount of the stored map.

In this case, the current sensing section 10 is configured to perform the offset correction of the direct current bus bar current signal IDC by the offset correction value OC in a region (region including the first to third speeds) of the motor rotation speed which is smaller than the predetermined rotation speed (the fourth rotation speed). The current sensing section 10 is configured to set the offset correction amount of the direct current bus bar current signal IDC by the offset correction value OC to the constant value in a region (region higher than the first to third rotation speeds) of the motor rotation speed which is equal to or greater than the predetermined rotation speed (the fourth rotation speed).

The region where the motor rotation speed is equal to or greater than the predetermined rotation speed (the fourth rotation speed) is a state where the modulation rate in the PWM control is saturated. Accordingly, it is possible to decrease the operation load of the controller 230 by omitting the process of setting the offset correction value OC.

In the above-described embodiment, the phase current sensing section 10A (the offset correction section 10A1) is configured to perform the offset correction of the direct current bus bar current signal IDC by the reference offset correction value OCB, and the offset correction value OC according to and the motor rotation speed. However, it is possible to omit the offset correction by the reference offset correction value OCB, by including the correction request by the reference offset correction value OCB, in the offset correction value OC.

Moreover, the offset correction value setting section 10B is configured to determine the offset correction value OC according to the motor rotation speed, based on a function to calculate the offset correction value OC by using the motor rotation speed as variable.

Furthermore, the steered wheels turned by the steering device may be front wheels or rear wheels of the vehicle.

A steering device according to the embodiments of the present invention, the steering device includes:

a turning mechanism (210) arranged to turn steered wheels (110,110);

an electric motor (220) which includes a motor rotor (221) and a stator coil (222), and which is arranged to provide a steering force to the steered wheels;

a command current signal producing section (15A) configured to produce a first command current signal (Id*, Iq*) to control and drive the electric motor;

a feedback control section (15B) configured to produce a second command current signal (Vu*, Vv*, Vw*) based on the first command current signal and a second sensed current signal (IDCC);

a PWM duty ratio signal producing section (19) configured to produce a duty ratio signal (Dutyu*, Dutyv*, Dutyw*) which is a signal of a duty ratio, based on the second command current signal;

a drive circuit (240) which includes an inverter (4), and which is configured to control and drive the inverter based on the duty ratio signal, and to control an electric power supplied to the stator coil;

a current sensor (50) configured to sense a current value of a current flowing in the stator coil, and to output the sensed current value as a first sensed current signal (IDC);

a motor rotation speed signal receiving section (10B2) configured to receive a motor rotation speed signal which is a signal of a rotation speed of the electric motor;

a second sensed current signal producing section (10A) configured to produce the second sensed current signal (IDCC) based on the first sensed current signal (IDC) and an offset correction value (OC); and an offset correction value storing section (10B1) configured to store the offset correction value (OC) including a first offset correction value (OC1) and a second offset correction value (OC2), the first offset value (OC1) being a current value for correcting the first sensed current signal (IDC) so that a value of a vibration of the electric motor is equal to or smaller than a first predetermined value when the motor rotation speed signal is a first rotation speed, or when a modulation rate of the PWM duty ratio signal producing section (19) is a first modulation rate, and the second offset value (OC2) being a current value for correcting the first sensed current signal (IDC) so that the value of the vibration of the electric motor is equal to or smaller than a second predetermined value when the motor rotation speed signal is a second rotation speed, or when the modulation rate of the PWM duty ratio signal producing section (19) is a second modulation rate.

In the present invention, there are provided the respective offset values for suppressing the vibration of the electric motor when the motor rotation speeds are the first rotation speed and the second rotation speed. Accordingly, it is possible to so smoothly drive the motor to suppress the torque vibration, and to improve the steering feeling.

The entire contents of Japanese Patent Application No. 2018-172351 filed Sep. 14, 2018 are incorporated herein by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

The invention claimed is:

1. A steering device comprising:
a turning mechanism arranged to turn steered wheels;
an electric motor which includes a motor rotor and a stator coil, and which is arranged to provide a steering force to the steered wheels;
a command current signal producing section configured to produce a first command current signal to control and drive the electric motor;
a feedback control section configured to produce a second command current signal based on the first command current signal and a second sensed current signal;
a PWM duty ratio signal producing section configured to produce a duty ratio signal which is a signal of a duty ratio, based on the second command current signal;
a drive circuit which includes an inverter, and which is configured to control and drive the inverter based on the duty ratio signal, and to control electric power supplied to the stator coil;
a current sensor configured to sense a current value of a current flowing in the stator coil, and to output the sensed current value as a first sensed current signal;
a motor rotation speed signal receiving section configured to receive a motor rotation speed signal which is a signal of a rotation speed of the electric motor;
a second sensed current signal producing section configured to produce the second sensed current signal based on the first sensed current signal and an offset correction value; and
an offset correction value storing section configured to store the offset correction value including a first offset correction value and a second offset correction value,
the first offset value being a current value for correcting the first sensed current signal so that a value of a vibration of the electric motor is equal to or smaller than a first predetermined value when the motor rotation speed signal is a first rotation speed, or when a modulation rate of the PWM duty ratio signal producing section is a first modulation rate, and
the second offset value being a current value for correcting the first sensed current signal so that the value of the vibration of the electric motor is equal to or smaller than a second predetermined value when the motor rotation speed signal is a second rotation speed, or when the modulation rate of the PWM duty ratio signal producing section is a second modulation rate, wherein the drive circuit includes a bridge circuit the current sensor is configured to sense a direct current bus bar current flowing in a direct current bus bar, and to output as the first sensed current signal; and the direct current bus bar is a wire between the bridge circuit and a power source arranged to supply electric power to the bridge circuit, or a wire between the bridge circuit and a ground, wherein the steering device include a phase current presuming section; the electric motor is a three phase brushless motor; the stator coil includes a u phase, a v phase, and a w phase;

the PWM duty ratio signal producing section is configured to produce a u phase duty ratio signal, a v phase duty ratio signal, and a w phase duty ratio signal which are, respectively, the duty signals for the u phase, the v phase, and the w phase; and the phase current presuming section is configured to presume the current values flowing in the u phase, the v phase, and the w phase, based on a first direct current bus bar current which is the direct current bus bar current sensed by the current sensor when the duty ratio signal of a maximum phase in which an energization time period is longest in the u phase duty ratio signal, the v phase duty ratio signal, and the w phase duty ratio signal is an ON state, when the duty signal of a minimum phase in which the energization time period is shortest in the u phase duty ratio signal, the v phase duty ratio signal, and the w phase duty ratio signal is an OFF state, and when the duty signal of an intermediate phase in which the energization time period is shorter than the energization time period of the maximum phase, and longer than the energization time period of the minimum phase is the OFF state, and to presume the current values flowing in the u phase, the v phase, and the w phase, based on a second direct current bus bar current which is the direct current bus bar current sensed by the current sensor when the duty ratio signal of the maximum phase is the ON state, when the duty ratio signal of the intermediate phase is the ON state, and when the duty ratio signal of the minimum phase is the OFF state.

2. The steering device as claimed in claim 1, wherein when a difference between an ON timing of the duty ratio signal of the maximum phase and the ON timing of the duty ratio signal of the intermediate phase becomes smaller than a first predetermined value, a pulse shift control section is configured to correct the phase of the ON timing of the duty ratio signal of the maximum phase or the ON timing of the duty ratio signal of the intermediate phase so that the difference between the ON timing of the duty ratio signal of the maximum phase and the ON timing of the duty ratio signal of the intermediate phase becomes equal to or greater than a second predetermined value greater than the first predetermined value; and when a difference between the ON timing of the duty ratio signal of the intermediate phase and the ON timing of the duty ratio signal of the minimum phase becomes smaller than the first predetermined value, the pulse shift control section is configured to correct the phase of the ON timing of the duty ratio signal of the intermediate phase or the phase of the ON timing of the duty ratio signal of the minimum phase so that the difference between the ON timing of the duty ratio signal of the intermediate phase and the ON timing of the duty ratio signal of the minimum phase becomes equal to or greater than the second predetermined value.

3. The steering device as claimed in claim 2, wherein the first offset correction value is a current value for correcting the first sensed current signal so that the value of the vibration of the electric motor is equal to or smaller than the first predetermined value when the motor rotation speed signal is the first rotation speed during the pulse shift control; and the second offset correction value is a current value for correcting the first sensed current signal so that the value of the vibration of the electric motor is equal to or smaller than the second predetermined value when the motor rotation speed signal is the second rotation speed during the pulse shift control.

4. The steering device as claimed in claim 1, wherein the offset correction value storing section includes a data interpolation section;

the data interpolation section is configured to determine, by an interpolation, a value between the first offset correction value and the second offset correction value when the motor rotation speed signal is between the first rotation speed and the second rotation speed, and to output the determined value as an offset correction value interpolation value; and the second sensed current signal producing section is configured to produce the second sensed current signal based on the first sensed current signal, and the offset correction value interpolation value which is the offset correction value.

5. The steering device as claimed in claim 4, wherein the data interpolation section is configured to determine, by a linear interpolation, a value between the first offset correction value and the second offset correction value when the motor rotation speed signal is between the first rotation speed and the second rotation speed, and to output the determined value as the offset correction value interpolation value.

6. The steering device as claimed in claim 4, wherein the offset correction value storing section includes a map; and the first offset correction value and the second offset correction value are map data stored in the map.

7. The steering device as claimed in claim 1, wherein the first offset correction value is a current value for correcting the first sensed current signal when the motor rotation speed signal is the first rotation speed, and a rotation direction of the motor rotator is both in a normal direction and in a reverse direction; and the second offset correction value is a current value for correcting the first sensed current signal when the motor rotation speed signal is the second rotation speed, and the rotation direction of the motor rotator is both in the normal direction and in the reverse direction.

8. The steering device as claimed in claim 1, wherein the first offset correction value is a current value for correcting the first sensed current signal so that the value of the vibration of the electric motor is equal to or smaller than the first predetermined value when the motor rotation speed signal is the first rotation speed; and the second offset correction value is a current value for correcting the first sensed current signal so that the value of the vibration of the electric motor is equal to or smaller than the second predetermined value when the motor rotation speed signal is the second rotation speed.

9. The steering device as claimed in claim 8, wherein the offset correction value storing section includes an offset correction value adjusting section; and the offset correction value adjusting section is configured to vary and adjust the offset correction value in accordance with a variation of an environment temperature.

10. The steering device as claimed in claim 1, wherein the PWM duty ratio signal producing section is configured to vary and adjust a carrier frequency when the motor rotation speed signal is equal to or greater than a third rotation speed.

11. The steering device as claimed in claim 10, wherein the second sensed current signal producing section is configured to produce the second sensed current signal without using the offset correction value when the motor rotation speed signal is equal to or greater than a fourth rotation speed which is higher than the first rotation speed, the second rotation speed, and the third rotation speed.

* * * * *